CARTON ERECTING AND STAYING APPARATUS

Filed Jan. 6, 1961

10 Sheets-Sheet 1

INVENTORS
SHERMAN W. TWITCHELL
EDWARD A. BAILEY

BY Hans G. Hoffmeister.

ATTORNEY

INVENTORS
SHERMAN W. TWITCHELL
EDWARD A. BAILEY
BY Hans G. Hoffmeister
ATTORNEY

CARTON ERECTING AND STAYING APPARATUS

Filed Jan. 6, 1961 10 Sheets-Sheet 3

INVENTORS
SHERMAN W. TWITCHELL
EDWARD A. BAILEY

BY Hans G. Hoffmeister
ATTORNEY

INVENTORS
SHERMAN W. TWITCHELL
EDWARD A. BAILEY
BY Hans G. Hoffmeister
ATTORNEY

CARTON ERECTING AND STAYING APPARATUS

Filed Jan. 6, 1961 10 Sheets-Sheet 5

INVENTORS
SHERMAN W. TWITCHELL
EDWARD A. BAILEY
BY Hans G. Hoffmeister
ATTORNEY

CARTON ERECTING AND STAYING APPARATUS

Filed Jan. 6, 1961

INVENTORS
SHERMAN W. TWITCHELL
EDWARD A. BAILEY
BY Hans G. Hoffmeister
ATTORNEY

March 12, 1963 S. W. TWITCHELL ET AL 3,080,796

CARTON ERECTING AND STAYING APPARATUS

Filed Jan. 6, 1961 10 Sheets-Sheet 7

INVENTORS
SHERMAN W. TWITCHELL
EDWARD A. BAILEY

BY Hans G. Hoffmeister
ATTORNEY

CARTON ERECTING AND STAYING APPARATUS

Filed Jan. 6, 1961

INVENTORS
SHERMAN W. TWITCHELL
EDWARD A. BAILEY

BY Hans G. Hoffmeister,
ATTORNEY

INVENTORS
SHERMAN W. TWITCHELL
EDWARD A. BAILEY

BY Hans G. Hoffmeister
ATTORNEY

March 12, 1963 S. W. TWITCHELL ETAL 3,080,796

CARTON ERECTING AND STAYING APPARATUS

Filed Jan. 6, 1961 10 Sheets-Sheet 10

INVENTORS
SHERMAN W. TWITCHELL
EDWARD A. BAILEY

BY Hans G. Hoffmeister

ATTORNEY

United States Patent Office 3,080,796
Patented Mar. 12, 1963

3,080,796

CARTON ERECTING AND STAYING APPARATUS

Sherman W. Twitchell and Edward A. Bailey, Contoocook, N.H., assignors to FMC Corporation, San Jose, Calif., a corporation of Delaware Filed Jan. 6, 1961, Ser. No. 81,092
14 Claims. (Cl. 93—41)

This invention relates to carton erecting and staying apparatus and more particularly to a quadruple staying machine.

Machines of the type to which this invention relates feed blanks, previously scored and cut, one at a time from a hopper to a position wherein the blanks overlie fixed blank folding means. A reciprocating plunger or form descends against the blank and folds it into a box. Adhesive staying strips are fed along the four corners of the erected box and four corner pressers are advanced to press the strips against the box corners. The stayed box is then deposited on a takeaway conveyor running beneath the folding means, and the operation is repeated.

An object of the invention is the provision of a staying apparatus that is of economical construction and that is light in weight in that it has relatively few and simple parts, does not require a heavy cast iron frame or cumbersome levers, and needs no oil sump. This facilitates installation of the machine in plants having modest floor or elevator load carrying capabilities.

Another object of the invention is to mount the driving mechanism near an upper portion or level of the frame of the machine where it is accessible for adjustment and maintenance, leaving the area below the blank folding means clear for the mounting of one or more takeaway conveyors. Such conveyors can deliver the finished boxes in any one of four horizontal directions or may pass them through the floor directly under the machine.

Another object of the invention is to provide a box forming and staying apparatus of the nature described that has low power requirements and that minimizes friction in the working parts.

Another object is to reduce wear in the moving parts, particularly in the mechanism that operates the corner pressers.

Another object of the invention is to provide for lateral adjustment of the members mounting the corner pressers and stay strip feeders on the frame, which adjustment can be accomplished readily by operations performed near the upper level of the apparatus, and which does not require complicated screw mechanism for the adjustment.

Briefly, these objects are accomplished by providing near an upper level of the apparatus, and at one end thereof, a master shaft which is power driven and which mounts a series of cams. These cams drive the reciprocating form or plunger, a blank feeder shoe that starts a blank from under the stack of blanks in the hopper, the stay strip feeding mechanism, and the corner presser shoes. The cam surface means that drives the corner presser mechanism is axially elongated along the master shaft, and, in fact may be machined directly on the master shaft itself. In this construction, the rails supporting the corner blocks which mount the stay strip feeder heads and the corner pressers, are moved laterally to adjust them for box width. The design of the mechanism is simple. During lateral adjustment of the rails, the cam followers merely slide along the elongate cams on the master shaft.

Another object of the invention is to eliminate the need for complicated mechanism for driving the stay strip feed ratchet device. In accordance with the invention, the stay strip feeding ratchet is driven directly from an adjustable crank on the master shaft and the drive includes longitudinal shafts and a cross shaft carrying bevel gears slidably mounted on the cross shaft to provide for the aforementioned lateral adjustment of the corner blocks.

Another object of the invention is to provide better control of the blank during its transfer from the hopper to its registered position under the form, as well as to eliminate the need for an additional blank pusher or ejector for handling the blank after it leaves a pair of feed rollers disposed adjacent the gate of the hopper. In accordance with the present invention, the feed rolls and associated mechanism are such that the feed rolls themselves completely position the blanks over the blank folding means, centered relatively to the form axis.

Another object of the invention is to provide box crimpers which bend the sides and ends of the box inwardly after the form has been retracted therefrom, which crimpers are entirely automatic and need not be mechanically driven or timed with regard to the descent of the box folding form.

Another object of the invention is the elimination of racks and pinions from the mechanism that operates the corner pressers, thereby reducing lost motion and wear, and simplifying the apparatus.

Another object of the invention is to improve the effectiveness of the seal made by a staying strip at each corner of the box. This is accomplished by the use of a spring loaded corner presser that provides uniform staying pressure along the entire extent of each corner, and by providing for adjustment of the maximum staying pressure so that the staying pressure can be selected to have the proper value corresponding to the length of the box corners.

Another object is to provide a smooth gradual folding operation for the flaps of the box, which folding operation will not tear or mutilate the box even though the machine may be operated at relatively high speed.

The manner by which these and other objects of the invention may be attained will be apparent from the following detailed description of the invention taken in conjunction with the accompanying drawings:

In the drawings:

FIG. 6 is an enlarged section taken on lines 6—6 of

Figures 1, 1A:
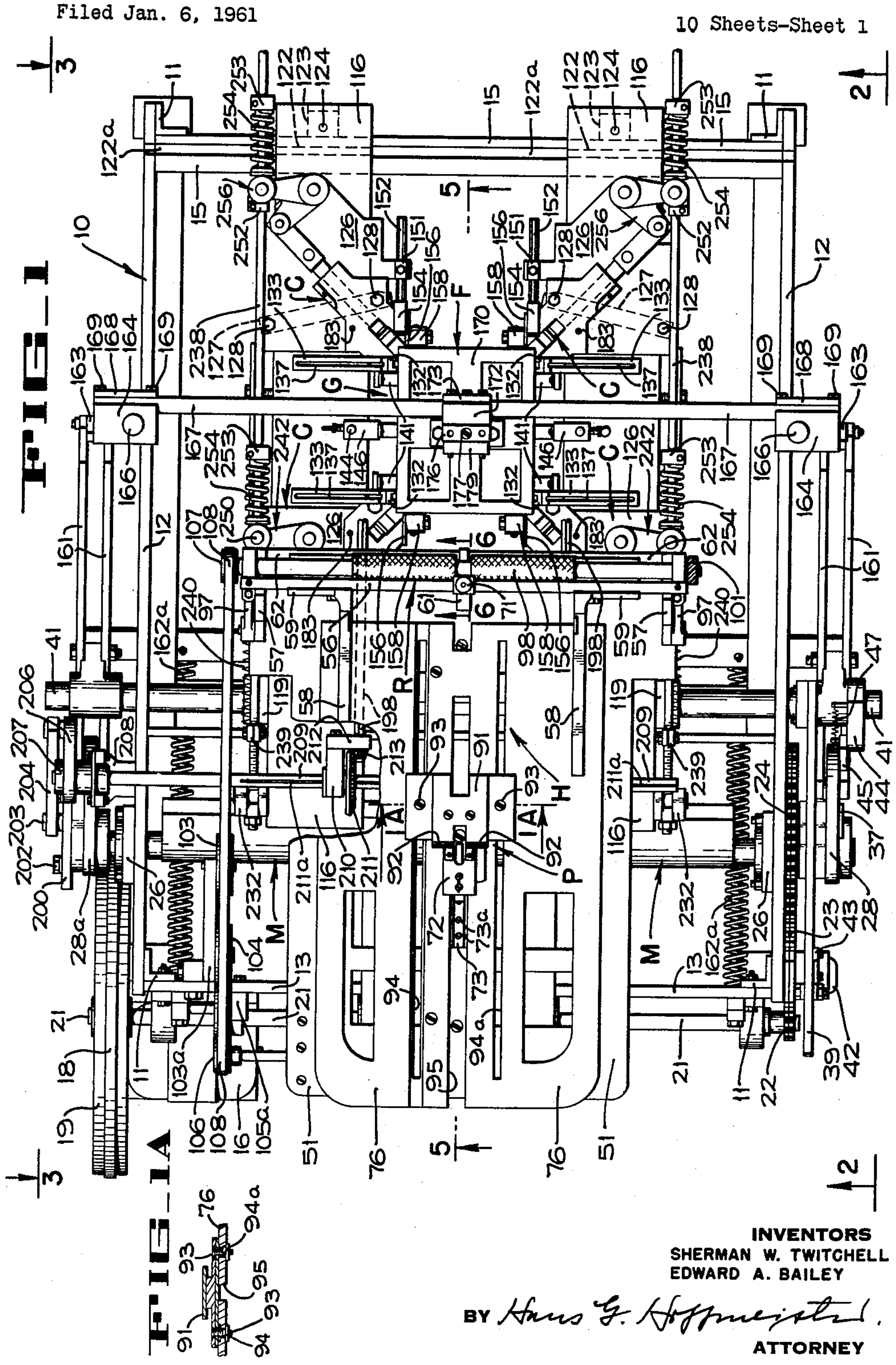
FIG. 1 is a plan of the apparatus of the invention with the stay strip feeders, tape reels, and blank folding guides removed for clarity.
FIG. 1A is a fragmentary section taken on lines 1A—1A of FIG. 1.

FIG. 1 and showing the blank gate and feed roller assembly.

Figures 6, 7, 7A, 7B:
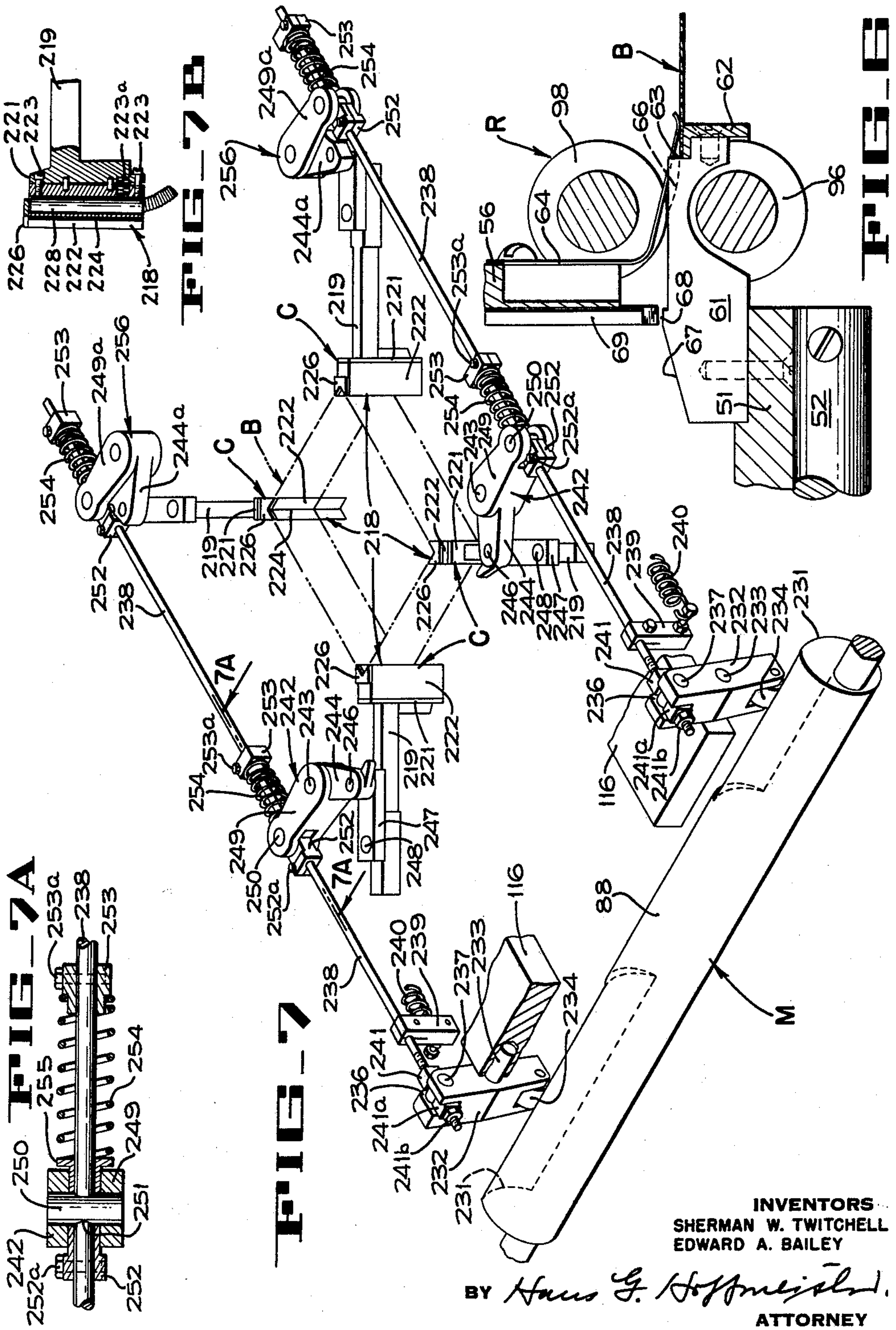

FIG. 7 is a perspective showing the link and bell crank mechanism for the corner pressers.

FIG. 7A is an enlarged fragmentary section taken on lines 7A—7A of FIG. 7 and showing the spring connection to a bell crank lever.

FIG. 7B is a fragmentary section of one of the corner blocks.

Figure 8:
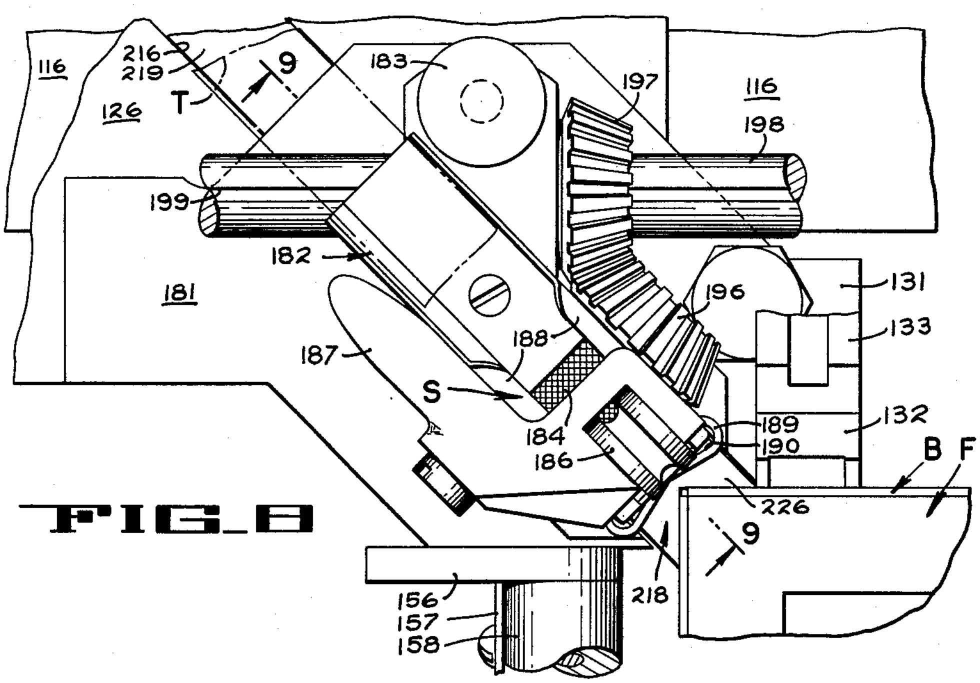

FIG. 8 is a plan of one stay strip feeder assembly.

Figure 9:
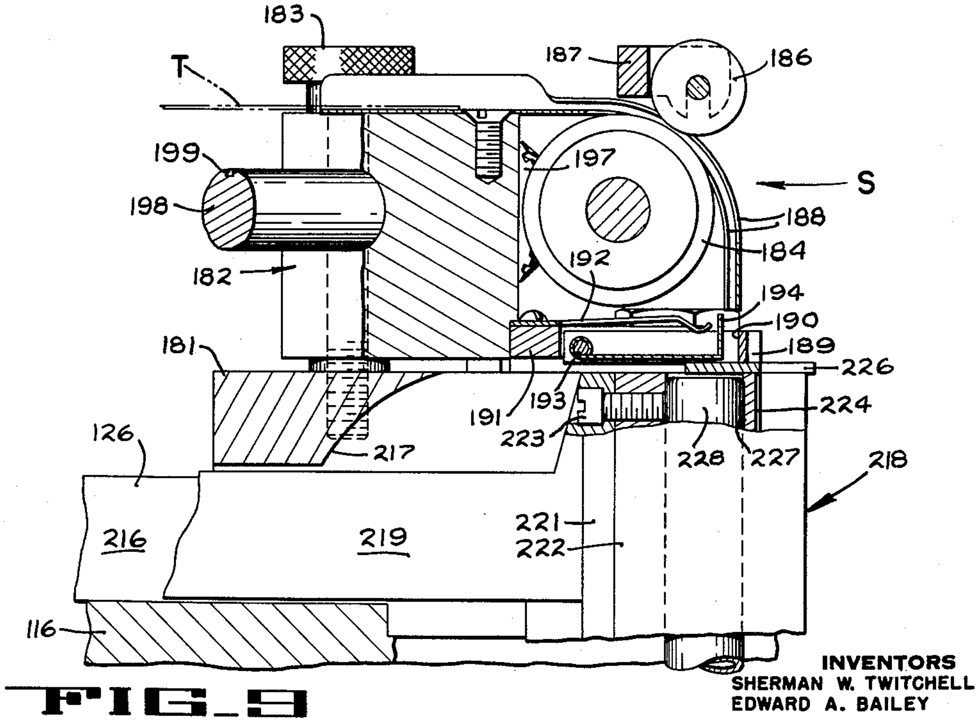

FIG. 9 is a section taken on lines 9—9 of FIG. 8.

Figure 10:
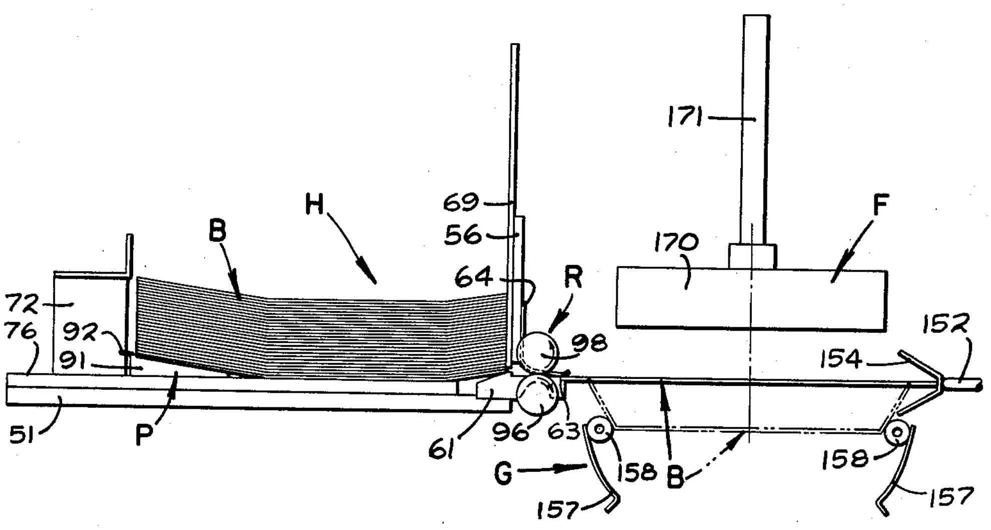

FIG. 10 is a schematic diagram of the operation of the blank feed apparatus.

FIGS. 11–15 are perspective diagrams showing successive stages in the forming and crimping of a box in accordance with the invention.

The carton forming and staying apparatus of the invention is of the type that is supplied with cut and scored blanks. These blanks are successively fed to a folding station whereupon a form descends upon the blanks and forces them down into the folding station to form the ends and sides of the box. Adhesive staying strips are then applied to the corners of the box, the form is withdrawn and the completed box is ejected onto a takeaway conveyor.

*General Arrangement of the Apparatus*

The apparatus is mounted on a rectangular frame indicated generally at 10 (FIGS. 1–5) supported on legs 11. At the upper ends of the legs are side plates 12 extending longitudinally of the apparatus and an end plate 13 (FIGS. 1, 4 and 5) is provided at the blank receiving end of the apparatus. A cross-brace 14 (FIG. 5) connects the longitudinal side plates 12 at an intermediate position in the apparatus. An end channel member 15 (FIG. 2) connects the side plates 12 at the opposite end of the apparatus.

A hopper indicated generally at H (FIGS. 1–5) is provided for receiving a stack of cut and scored carton blanks. The blank at the bottom of the pile is advanced by a blank feeder or pusher assembly indicated generally at P, which advances the blanks one at a time through a gate and into the nip of a feed roll assembly R. The feed roll assembly advances the blanks into position over a blank support and folding guide assembly indicated generally at G, which assembly also includes automatic blank crimpers. The forming apparatus is indicated generally at F. Mounted for vertical reciprocation above the blank folding assembly G is a rectangular blank folding form which is made up to fit the inside of the box being formed in the apparatus. At each corner of the folding guide assembly is a stay strip feeder unit S. These units have been omitted from FIG. 1 for clarity but appear in FIGS. 2–5, and one such unit is shown in detail in FIGS. 8 and 9. These units intermittently feed adhesive tapes from spools T along the corners of the boxes being formed. At each box corner is a corner presser assembly indicated generally at C. The function of these assemblies is to press the strips of adhesive tape against the corners of the box while the form is still within the box, and also to cut the tapes to length. Beneath the blank support and folding guide assembly G is a discharge conveyor D which carries completed boxes out of the apparatus. This conveyor appears in FIGS. 3 and 4. An important part of the apparatus is a master shaft and cam assembly M, which appears in FIGS. 1, 4, 5 and 7, and which is mounted at the upper or working zone of the apparatus. Construction details of the various units making up the complete forming and staying apparatus of the invention and their method of operation will now be explained.

*Master Shaft Drive and Clutch Assembly*

Figure 4:
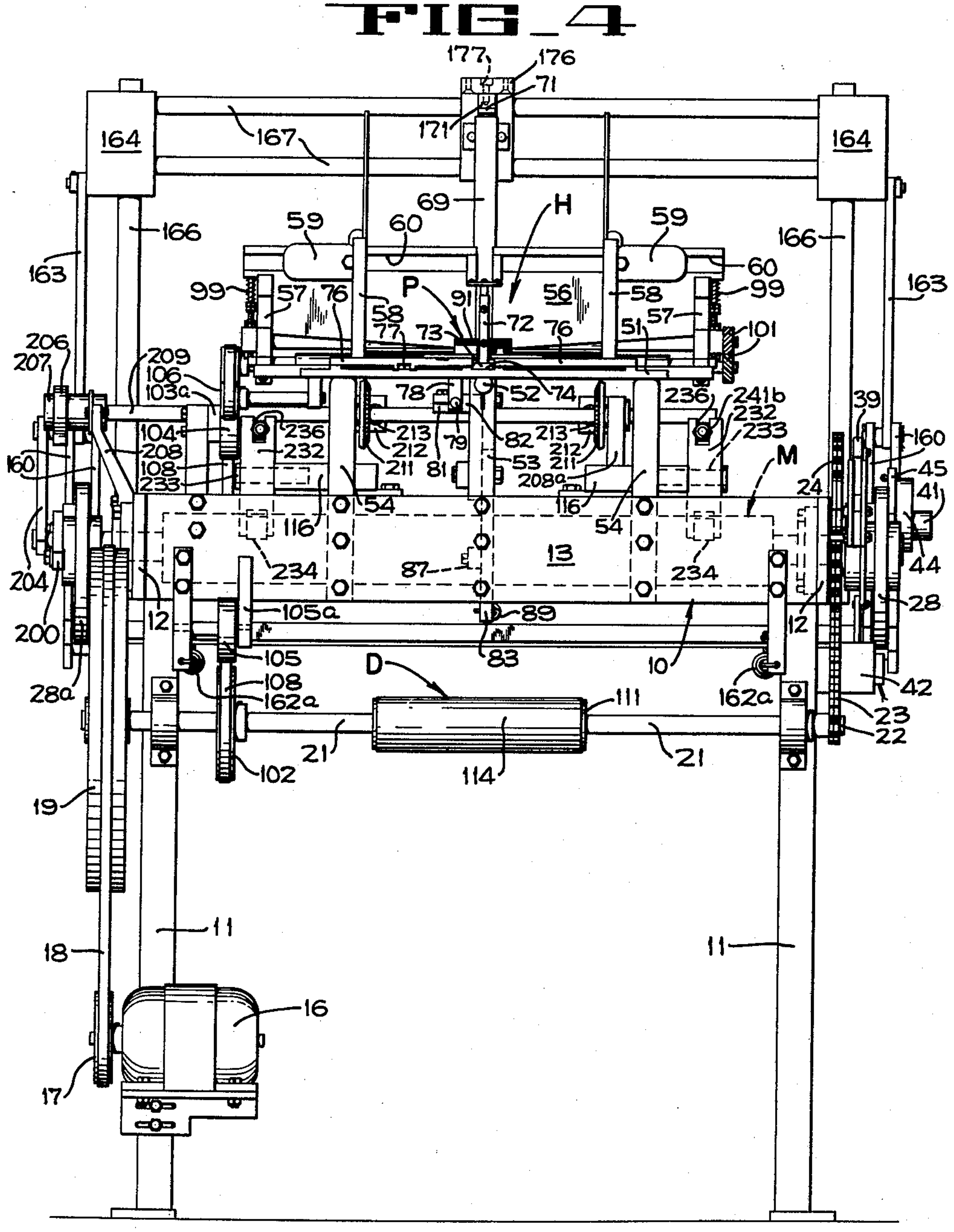
FIG. 4 is an end elevation viewed from the blank hopper end of the apparatus as indicated by the lines 4—4 of FIG. 1.

The master shaft drive and clutch assembly is best seen in FIGS. 1, 2, 2A and 4. A drive motor 16 mounts a pulley 17 which drives a V-belt 18 that is trained around a driven pulley 19. Pulley 19 is keyed to a countershaft 21 extending across the machine as seen in FIG. 4. At the end of the countershaft opposite driven pulley 19 is a double drive sprocket 22 (FIGS. 2 and 4) which drives a double chain 23 that passes around a pair of driven sprockets 24, whose common hub 25 (FIG. 2A) is rotatably mounted on the master shaft M. As seen in FIG. 1, both ends of the master shaft M are mounted in bearings 26 in the longitudinal side plates 12.

Figures 2, 2A, 2B:
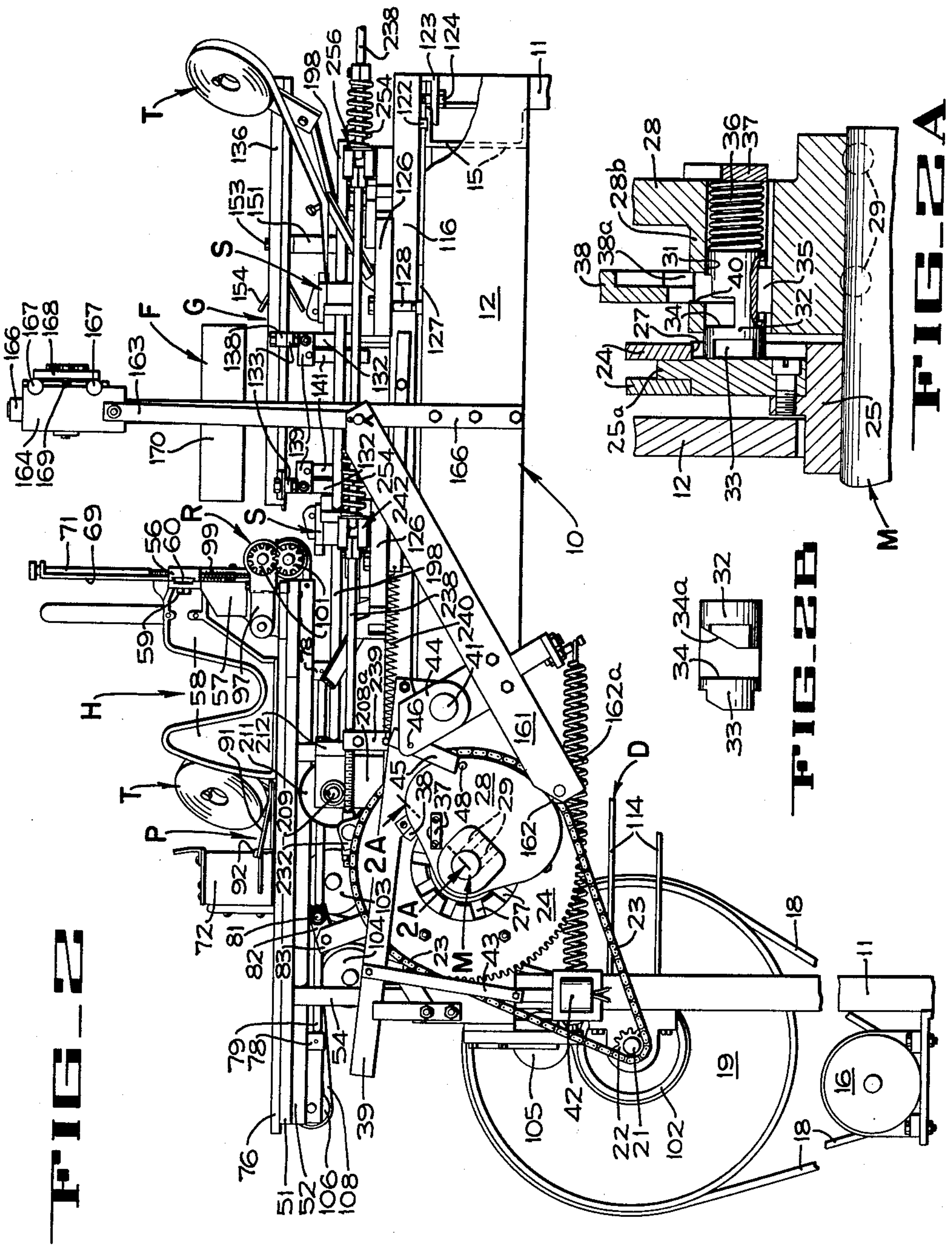
FIG. 2 is a partly broken away side elevation of the apparatus viewed as indicated by the lines 2—2 of FIG. 1 and showing the chain and sprocket drive and clutch.
FIG. 2A is an enlarged fragmentary section taken on lines 2A—2A of FIG. 2 and showing clutch details.
FIG. 2B is a plan of the clutch dog pin.

In order to frictionally absorb the shock that occurs when the drive is started, the radially inner portions of sprockets 24 are frictionally clamped (by means not shown) to a hub flange 25*a* bolted to hub 25. The hub flange 25*a* is formed with radial recesses 27 forming clutch jaws, seen in FIGS. 2 and 2A. Mounted on the outer end of master shaft M is a cam 28 keyed thereto by screws 29. The sprocket 24 and its hub can rotate independently of the master shaft M and cam 28 keyed thereto, but the clutch provides for connecting these parts for simultaneous rotation when desired. Referring again to FIG. 2A there is a bore 31 in the hub 28*b* of cam 28 and a clutch dog pin 32 is slidably mounted in the bore. A nose 33 is formed on the end of the clutch dog pin for entering any one of the recesses 27 in the sprocket 24. A transverse cam slot 34 is milled in a side of the clutch dog pin to provide for retraction thereof. One wall 34*a* (FIG. 2B) is inclined relatively to the opposite wall, so that the end of the slot which leads as the cam 28 rotates tapers toward the trailing end of the slot. The clutch dog pin is slidably keyed to the hub 28*b* of cam 28 by means of a key 35 and a cooperating feather keyway formed in the hub. The clutch dog pin is urged into clutch engaging relation with the constantly rotating sprocket 24 by means of a spring 36 retained in the bore 31 of the cam 28 by a keeper plate 37 as seen in FIGS. 2 and 2A. The lower end of a clutch dog release cam 38 extends into a circumferential slot 40 in the hub 28*b* and has a wedge portion 38*a* in position to enter the cam slot 34 in the clutch dog pin 32 and to engage the sloping wall 34*a* thereof. Cam 38 is mounted on a release cam mounting arm 39 (FIG. 2) which arm is pivotally mounted on a cross shaft 41 fixed to the frame of the apparatus. A clutch control solenoid 42 is connected to the arm 39 by means of a link 43. Mounted on shaft 41 is an outboard plate 44, and an anti-reverse arm 45 is pivotally mounted on plate 44 at 46. The arm 45 is urged into the position shown in FIG. 2 by means of a spring 47 (FIG. 1). A pin 48 extends from the cam 28 and is disposed in the path of the end of anti-reverse arm 45. The purpose of this construction is to prevent backing up of the cam 28 when the clutch is disengaged, but the spring mounting of arm 45 will permit the pin 48 to ride over the end of the arm until it reaches the position shown in FIG. 2.

The operation of the clutch is as follows: When the arm 39 is in its raised position, which is the position illustrated in FIG. 2, clutch release cam 38 clears the clutch dog pin 32 and the spring 36 causes engagement of the clutch so that the sprocket 24, cam 28 and master shaft M all rotate together. This is the condition for continuous operation and can be maintained by uninterrupted energization of the clutch solenoid 42. This is the manner in which the apparatus is usually operated when the staying apparatus is not synchronized with the operation of other box processing machines. In case it is desired to synchronize the staying apparatus with another machine, such as a wrapping machine, for example, the wrapping machine can take control of clutch solenoid 42 on the stayer.

When the solenoid 42 is de-energized, the weight of arm 39 brings the cam 38 into the path of the rotating clutch dog pin 32. And when the dog 32 reaches the release cam 38 it is cammed clear of the notches 27 in the sprocket 24, thereby disengaging the clutch and permitting the cam 28 and master shaft M to cease rotating while the sprocket 24 continues to rotate. The cam 28 and the master shaft are prevented from reverse rotation by the pin 48 and the anti-reverse arm 45, as previously described. To resume operation of the machine, the clutch solenoid is again energized, permitting the clutch to engage.

*Blank Hopper and Feed Mechanism*

The blank hopper and feed mechanism has several functions. It must support a stack of scored and cut carton blanks and must feed the blanks one at a time from the bottom of the stack a sufficient distance to advance the leading edge of each blank into the nip of the feed rollers. The blank hopper and feed mechanism must also provide for adjustment to accommodate blanks having different lengths as well as blanks having different widths. The stroke of the blank starting apparatus is constant. The feed mechanism of this invention includes two tables. There is a lower table which is mounted directly on the frame of the apparatus. The lower table is fixed during operation of the machine, but it can be longitudinally adjusted to accommodate different lengths of blanks. Mounted on the lower or normally fixed table are the side guides for the stack of blanks, the gate mechanism for accepting one blank at a time for delivery to the feed rolls, and the feed rolls themselves. In addition to the lower table there is an upper table mounted thereon for reciprocating motion in a longitudinal direction. This table, which supports the bottom of the stack of blanks, mounts a blank pusher or feeder shoe that pushes the lowermost blank between the feed rolls.

Figures 5, 5A, 5B, 5C:
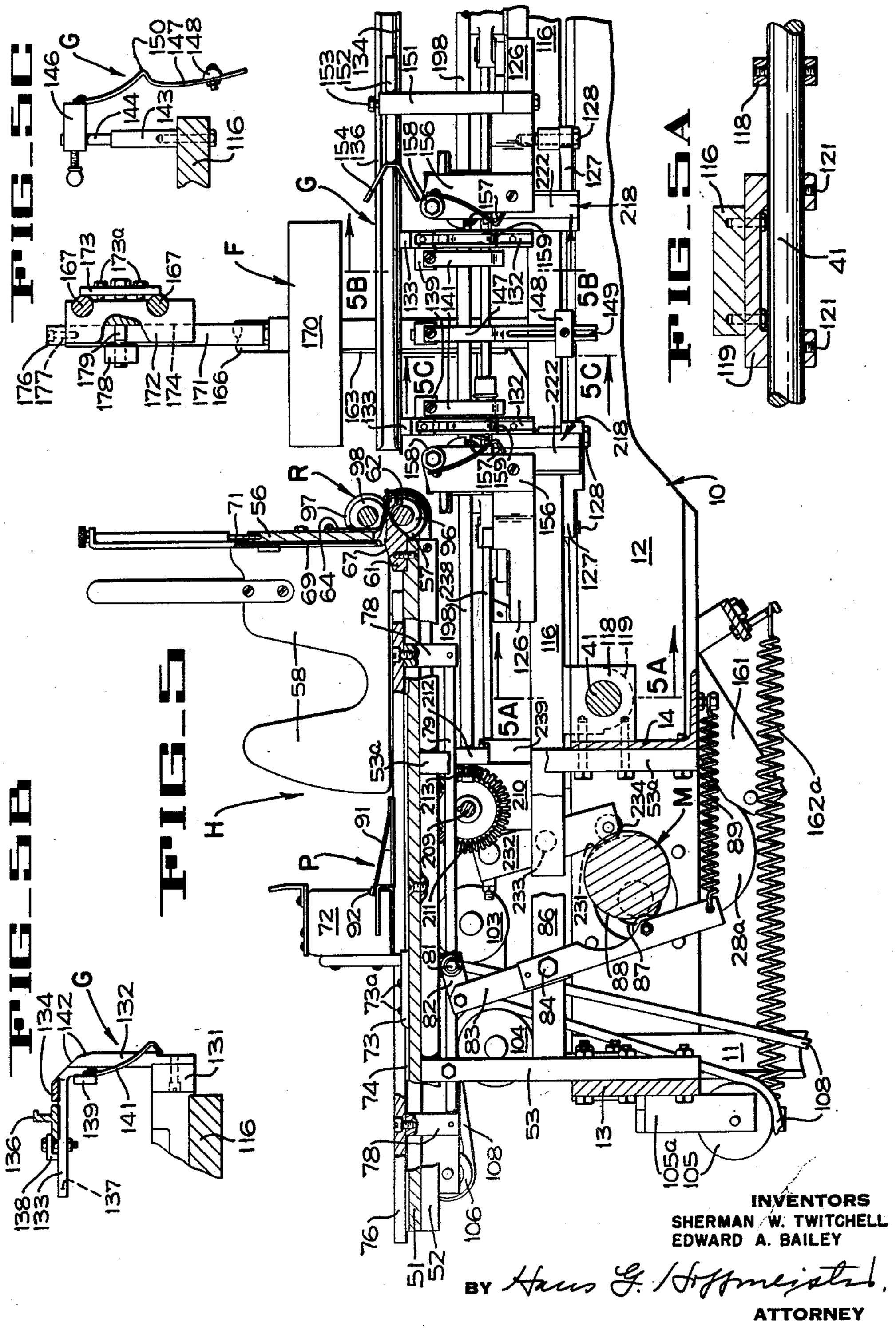
FIG. 5 is a section taken on lines 5—5 of FIG. 1.
FIG. 5A is a section taken on lines 5A—5A of FIG. 5 showing the adjustable mounting of one of the rails that mount the corner blocks.
FIG. 5B is a section taken on lines 5B—5B of FIG. 5 showing the mounting of carton folding guides.
FIG. 5C is a section taken on lines 5C—5C of FIG. 5 showing the mounting of special crimping springs.

Describing this mechanism in more detail, the adjustably mounted lower table is indicated at 51 (FIGS. 1–5 and 10). Secured to the underside of the table 51 is a longitudinal guide rod 52, shown in FIGS. 2, 4, and 5. A central clamp post 53 extends upwardly from end plate 13 and clamps the guide rod 52. Another vertical clamp post 53*a* extends upwardly from brace 14, as seen in FIG. 5. As seen in FIG. 4, vertical table support posts 54 are bolted to cross plate 13 and extend upwardly therefrom and engage the under surface of table 51 at points spaced laterally from the central post 53.

As seen in FIGS. 1, 4 and 5, a transverse plate 56 forms the vertical forward wall or end of the hopper H. This plate is mounted on side brackets 57 (FIGS. 1, 2 and 4) which brackets are bolted to the lower table 51. Laterally adjustable side guides 58 are slidably mounted on the plate 56, these guides being mounted on the plate by means of arms 59 which are adjustably mounted in a horizontally extending dovetail slot 60 (FIGS. 1, 3 and 4) formed in plate 56.

As seen in FIGS. 5 and 6, a blank gate threshold shoe 61 is fastened to the delivery end of the lower table 51. A transverse strap 62 is screwed to the outer end of shoe 61 and is connected at each end to the frame of the apparatus, the connection not appearing in the drawings. The purpose of the strap 62 is to provide additional support for the positioned blank. As best seen in FIG. 6, a notch is formed in the shoe 61 to provide a blank locating shoulder 63 for a blank B that has been advanced to a position clear of the feed rollers. A blank gripping spring 64 is mounted on the plate 56 to depress the blank as its trailing edge passes the shoulder 63 so that the blank will be prevented from rearward motion by the shoulder. The shoe is recessed at 66 to receive the end of the spring 64. A ramp 67 is formed on the shoe to facilitate sliding of the blanks to a threshold step 68 formed on the shoe. A vertically adjustable gate 69 is slidably mounted on plate 56 and the gate is adjusted to a position relative to the threshold step 68 so as to permit but one blank at a time to pass beneath the gate. As seen in FIG. 5, a gate adjusting screw 71 is threaded into the cross plate 56 and provides a micrometer adjustment for the gate.

An adjustable back guide 72 for the blanks is also provided. As seen in FIGS. 1, 4, and 5, the back guide 72 is formed with a slide 73 mounted in a dovetail slot 74 formed in the lower table 51. Set screws 73*a* are provided in slide 73 to lock the back guide 72 in the proper position corresponding to the length of the blanks received in the hopper.

In order to support the blanks and to start and feed the blanks to the feed rolls, an upper or sliding table 76 is mounted on the lower table 51. As seen in FIG. 4, there is a longitudinal notch formed in the under surface of the upper table that receives a guide key or rib 77 mounted on and extending upwardly from the lower table 51. In order to reciprocate the table 76, a pair of downwardly extending posts 78 (FIGS. 4 and 5) are mounted thereon which posts are clamped to a longitudinally extending rod 79. A pivot pin block 81 (FIG. 4) is clamped to an intermediate portion of rod 79 and a link 82 (FIG. 5) is pivoted to the pin of the pivot pin block 81. Rod 79 can be moved through pin block 81 to determine the zone of reciprocation of the upper table relative to the lower table. A cam follower arm 83 (FIG. 5) is pivoted at its upper end to the link 82 and is pivotally mounted at 84 on a longitudinal frame member 86 that extends between vertical posts 53 and 53*a* previously described. A cam follower roller 87 is mounted on the arm 83 and the roller engages a feed cam portion 88 formed integrally with the master shaft M. The follower roller 87 is held in engagement with the cam 88 by means of a spring 89. Mounted on top of the table 76 is a pusher block 91 (FIGS. 1, 1A and 5) to which are fastened transversely aligned lugs 92, the thickness of which is somewhat less than that of a blank. The block 91 is adjustably mounted on the upper table by means of clamp screws 93 that extend through slots 94 and 94*a* in the table. Back guide 72 extends through a slot 95 formed in the upper table.

As the master shaft M rotates, cam portion 88 operates the cam follower arm 83 to cause reciprocation of the sliding table 76 upon the lower table 51. This retracts the lugs 92 on the pusher block 91 to a rearward position wherein the lugs clear the stack of blanks. When the table 76 is advanced, lugs 92 engage the lowermost blank in the hopper H and eject it through the gate and into the nip of the feed rolls, the latter thereupon taking over and completing the feeding step. The adjustment of the table 51 and back guide 72 for accommodating a stack of blanks of a given length will be explained in detail after description of other portions of the apparatus has been completed.

*Feed Roll Mechanism*

The feed roll mechanism R is shown in FIGS. 1–5. It is a feature of the present invention that no mechanism other than the feed rolls themselves is required to complete the feed, regardless of the fact that blanks of different lengths are accommodated by the apparatus.

A lower feed roll 96 is mounted in side brackets 57 which are the brackets that mount the cross plate 56 at the front of the hopper. A pair of arms 97 are pivotally mounted on brackets 57 and these arms support the upper feed roll 98. Spring assemblies 99 urge the upper roll against the lower roll to grip the blanks being fed by the rolls. The function of the feed roll mechanism is to complete the feed of the blanks until they are centered over the blank folding guides. The feed rolls are geared together by meshed gears 101 keyed to the rolls, which gears appear in FIGS. 2 and 4.

Figure 3:
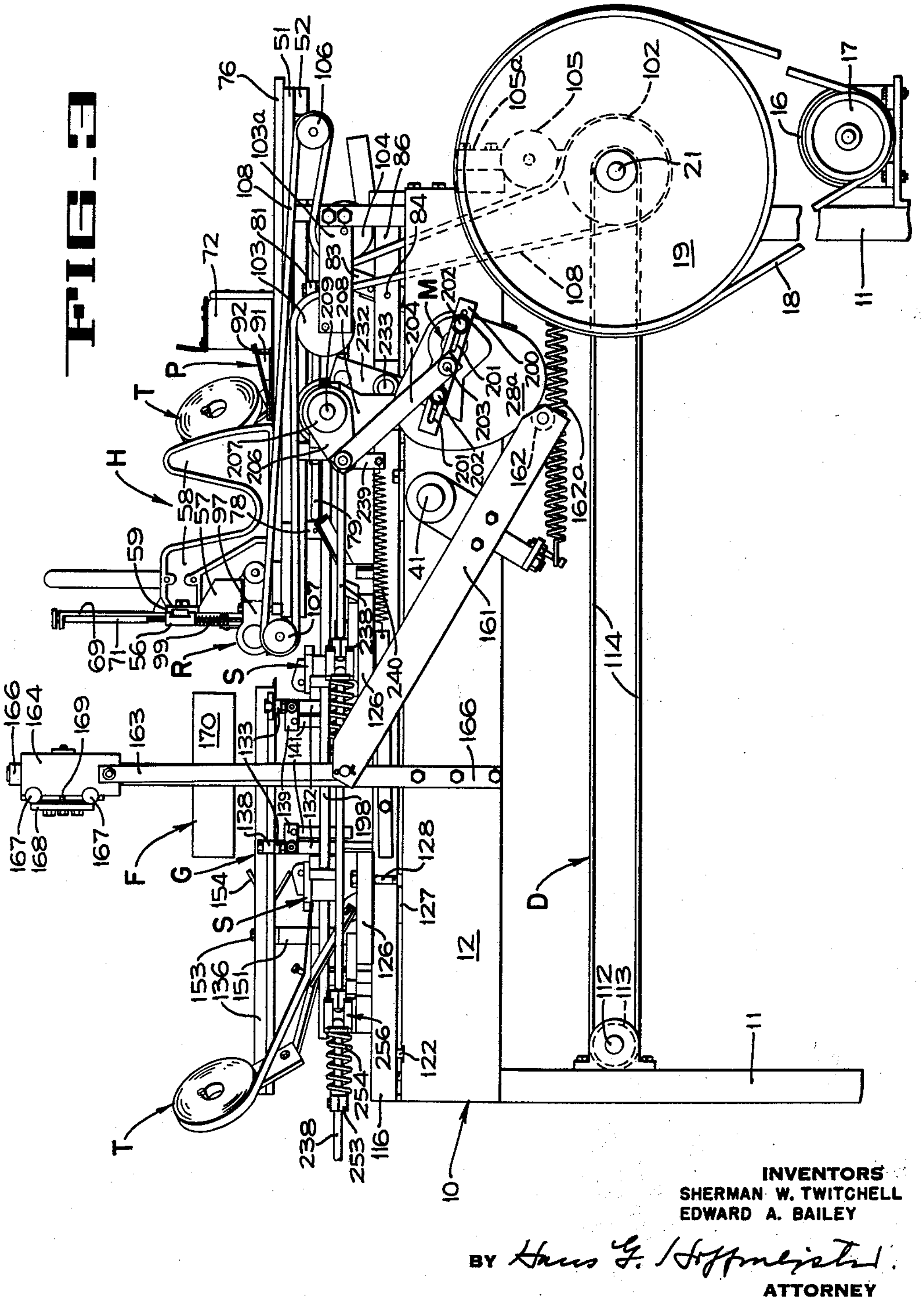
FIG. 3 is a side elevation viewed as indicated by the lines 3—3 of FIG. 1 and showing the motor and V-belt drive.

The feed rolls 96 and 98 are driven continuously by a V-belt and pulley assembly. A pulley 102 is mounted on the cross-shaft 21 that is driven by the motor. As best seen in FIG. 3, four idler pulleys 103, 104, 105, and 106 are provided for a V-belt 108 that drives the feed rolls. The V-belt is trained around the drive pulley 102 on shaft 21, passes over the idler pulleys just mentioned, and drives a pulley 107 keyed to the shaft of lower feed roll 96, which also drives the upper feed roll 98 by means of the meshed gears 101, as above explained. As can be seen from an examination of the belt and pulley assembly best seen in FIG. 3, since both idler pulley 106 and feed roll drive pulley 107 are mounted on the lower table 51, lower table 51 can be adjusted longitudinally of the machine without requiring manipulation or adjustment of the idler pulleys. Fixed idler pulleys 103 and 104 are mounted on a forwardly extending bracket 103*a*, and fixed idler pulley 105 is mounted on a bracket 105*a* (FIGS. 3 and 4).

*Discharge Conveyor*

The discharge conveyor D is also driven by cross shaft 21. As seen in FIGS. 3 and 4, a second pulley 111 is mounted on shaft 21, and a cross shaft 112 is mounted at the discharge end of the apparatus. A belt pulley 113 is mounted on shaft 112 and the conveyor belt 114 is trained around pulleys 111 and 113. Both the conveyor belt and the feed rolls turn continuously when the drive motor is energized, regardless of the condition of the clutch assembly that drives the master shaft M.

*Blank Support and Folding Guide Assembly*

The blank support and folding guide assembly G bends up the ends and sides of the box as the form descends therethrough. It also automatically crimps the stayed box. The units of this assembly, as well as the stay strip feeders and the corner pressers are adjustably mounted on the machine so as to adapt the machine to make boxes of different lengths and boxes of different widths.

As seen in FIGS. 1–5, a pair of laterally spaced, longitudinally extending rails 116 are mounted on top of the frame 10. The rails are laterally adjustable on the frame to accomodate boxes of different widths. The fixed, transverse shaft 41, previously referred to, serves as a mounting for one end portion of each longitudinal rail 116. As seen in FIGS. 2 and 3, shaft 41 extends through both longitudinal side plates 12 of the frame, and although it is not shown in the drawings, the shaft is rigidly secured to these plates. The mid-portion of transverse shaft 41 is stabilized by a stationary central block 118 bolted to the cross-brace 14, as seen in FIGS. 5 and 5*a*. Brackets 119 are bolted to the rails 116 (FIG. 5*a*) which brackets slide on shafts 41 and can be clamped in their adjusted position by means of set screws 121. The other ends of rails 116 are mounted as indicated in FIGS. 1 and 2. To the right of FIG. 2 can be seen a way 122. One such way extends downward from each rail 116 and slides in a complementary groove 122*a* (FIG. 1) formed in cross-brace 15. L-shaped clamps 123 engage both the ends of rails 116 and the upper flange of cross-brace 15. The clamps can be tightened by clamp bolts 124 to hold the associated ends of the rails in their adjusted positions.

Four corner blocks 126 (FIGS. 1 and 5) are carried by the adjustable rails 116. These blocks 126 mount the corner pressers and the stay strip feeding units. The corner blocks can slide along the rails, and each is held in adjusted position by a clamp bar 127 that extends diagonally across the under surface of the associated rail 116. Two of these clamp bars are shown in broken lines in FIG. 1. Each clamp bar 127 can be set up by means of bolts 128 to clamp the respective corner block in its desired longitudinal position along the rail.

The box crimper and guide springs and the blank supporting rails appear in FIGS. 5, 5B, 5C and 11. A lug 131 is formed on each corner block 126 and fastened to each of these lugs is a vertical post 132. Laterally extending arms 133 are bolted to the vertical posts 132 (see FIG. 5B), and a blank supporting and folding rail 134 on each side of the machine extends across the two associated arms 133, both folding rails 134 extending longitudinally of the machine. Outwardly from, but parallel to rails 134 are side guide rails 136 (FIGS. 2, 3, 5 and 5B). These rails 136 have been omitted from FIG. 1 in the interest of clarity, but their position with respect to the rails 134 is indicated in FIG. 5B. The side guide rails 136 can be laterally adjusted to accommodate blanks of different widths. In order to provide for such adjustment the arms 133 are slotted at 137 (FIGS. 1 and 5B) and clamps 138 are provided having clamp bolts that extend through the slots for clamping the side rails 136 in their adjusted positions.

In order to mount a set of crimping springs formed in accordance with this invention, lugs 139 (FIGS. 5 and 5B) extend horizontally from arms 133 and these lugs mount downwardly extending side crimping springs 141, there being one spring adjacent each corner. Springs 141 also appear diagrammatically in FIG. 11. As seen in FIG. 5B, chamfers 142 are formed on posts 132 in order to assist in bending up the side and end walls of the box and to prevent the bending operation from occuring too abruptly, which might result in tearing of the blank.

Figure 11:
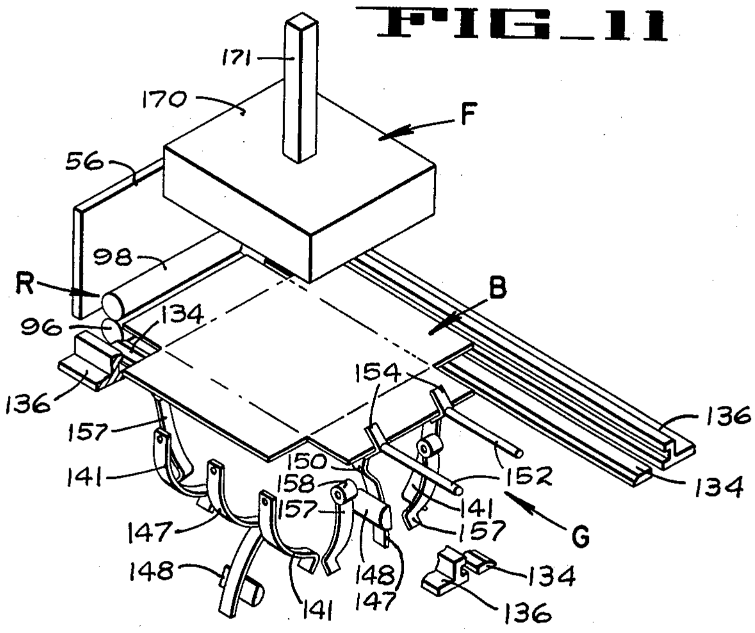

As seen in FIGS. 5, 5C and 11, a pair of special side crimping springs 147 are provided, there being one spring centrally mounted along each side of the blank. These springs have the additional function of acting as retractible stops for the bottom of the box. The central crimping springs 147 are not mounted on the corner blocks as are springs 141, but rather they are mounted on the rails 116, and remain longitudinally centered with respect to the form. In order to mount the special crimping springs 147, posts 143 (FIG. 5C) are bolted to rails 116, the posts each having a reduced portion 144 which mounts a vertically sliding block 146 that can be clamped in various positions to adjust for different box depths. Springs 147 are bolted to blocks 146 and incline generally downward and inward therefrom. At the lower ends of springs 147 are box bottom stops 148, which are adjustably mounted by means of clamp screws sliding in slots 149 formed in the lower ends of the springs. Springs 147 are bent to form cam noses 150, for reasons to be stated presently.

As seen in FIGS. 1 and 5, adjustable stops are provided to arrest the motion of the leading ends of the blanks as they are delivered by the feed rollers. To mount the stops, vertical posts 151 extend upwardly from corner blocks 126 that are located at the rear or delivery end of the machine. Horizontal rods 152 extend through apertures formed in the posts, and the rods can be clamped in their adjusted position on the posts by means of set screws 153. V-shaped stop shoes 154 are mounted on the inner ends of rods 152 for engaging the leading edges of blanks as they are fed by the feed rolls.

Four end crimping and box folding springs 157 are also provided, one for each corner of the box. As seen in FIG. 5, vertical posts 156 extend upwardly from corner blocks 126. These posts mount the end crimping springs 157 which springs are screwed to sleeves 158 and the sleeves, in turn, are bolted to the blocks 156. Springs 157 also appear in FIG. 11 and they move with the corner blocks as the latter slide along the rails 116 to provide for adjustment for blank length. Latch springs 159 (FIG. 5) are mounted in slots formed in vertical posts 132 for engaging the top of the folded box as the form is raised.

Sufficient structure has now been described to explain the adjustment of the feed tables for blank length. Since the longitudinal position of form assembly F is fixed on the machine, this adjustment must be such that each blank will come to rest with its center aligned with the vertical axis of the reciprocating form. To achieve this longitudinal centering, the adjustable stop shoe 154 is positioned at a distance from the vertical form axis that equals half the length of the blank. It will be recalled that the gate and feed rolls move with lower table 51. The lower table 51 is positioned longitudinally of the apparatus so that the shoulder 63 (FIGS. 6 and 10) is spaced from the axis of the form by half the length of the blank. It will be noted that this adjustment of the lower table 51 moves the gate and feed roll assembly R with the table so that the stroke of the blank starter shoe 91 can be constant and need only be long enough to place a blank in the nip of the feed rolls. The feed rolls operate at a speed sufficient to cause the blank to continue moving toward stop 154 after the blank leaves the nip of the rolls, and the inertia of the blank will carry it under spring 64 until the blank hits the stop shoe 154. When this occurs, spring 64 will depress the blank so that its trailing edges engages the shoulder 63 (FIG. 6) whereupon the blank is accurately centered relatively to the form axis and is ready for the folding operation.

The forward cross plate 56 that forms one wall of the hopper is fixed to and moves with lower table 51, whereas back guide 72 is adjustably mounted on the lower table 51 to accommodate various length blanks. The blank feed shoe 91 is adjusted for blank length by loosening the clamp screws 93 that hold the sleeve on the upper table 76. The clamp that holds pivot pin block 81 on longitudinal rod 79 allows the upper table 76 to be adjusted to the proper operating position in relation to the lower table.

*The Form Operating Mechanism*

The form operating mechanism appears in FIGS. 1–5. It is driven by the cam 28 (FIG. 2) and a similarly shaped and positioned cam **28*a* (FIG. 3), both cams being keyed to the master shaft M, so that both cams rotate whenever the master shaft rotates. As previously described, however, if the clutch (FIG. 2a) is disengaged, the drive sprocket 24 for the master shaft merely idles, and under this condition the cams 28 and 28*a* and the master shaft remain stationary. At both sides of the machine, cam follower arms 161 are pivoted on the fixed shaft 41 previously described as serving for the pivot of clutch control arm 39. Cam follower rollers 162 are mounted on arms 161 and are urged against the faces of cams 28 and 28*a* by means of return springs 162*a*. Pivoted to the upper ends of arms 161 are vertical links 163 and the upper ends of these links are pivotally connected to reciprocating blocks 164, which blocks are slidably mounted on pillars 166 extending vertically from the side frame members 12. A pair of vertically spaced, parallel cross rods 167 is provided to support the form. These rods are clamped to blocks 164 by means of clamp plates 168 and clamp bolts 169 threaded into blocks 164. The mounting for the form 170, as best seen in FIGS. 1 and 5, is a square post 171. Post 171 is mounted in a central mounting block 172, which is retained on cross rods 167 by means of a clamp plate 173 and clamp screws 173*a*. A slot 174 formed in central block 172 receives the vertical post 171. An upper cross bar 176 is bolted to the upper end of post 171 by means of the bolt 177 and serves as a mounting bar for an alternative form of different size which is used when the post 171 is inverted. A clamp plate 178 is bolted to block 172 and is provided with a central set screw 179 that clamps the post 171** in its vertically adjusted position.

Thus, with the mechanism just described, one rotation of the master shaft M causes the form 170 to move from its upper position shown in FIG. 5, down against the blank, whereuuon further descent of the form causes the ends and sides of the blank to fold up as they slide down along the guides and crimping springs of the apparatus. Further rotation of the master shaft withdraws the form 170 back to its uppermost position.

*Stay Strip Feed Mechanism*

The stay strip feed mechanism feeds a length of tape having an adhesive on one face thereof, along the V-face of each corner presser when the form is raised and before the corner presser comes forward against the corner of the box. The mechanism is arranged so that the length of tape fed thereby is adjustable to match the depth of the box.

Referring to FIGS. 8 and 9, each corner block 126 is formed with a raised pad 181 which supports a stay feed head 182. The stay feed head is retained on the pad 181 by means of a thumb screw 183 threaded into the pad. The gummed tape T is advanced by a knurled feed roller 184 against which a grip roller 186 is pressed by means of a spring mounting assembly 187. Details of this mechanism form no part of the invention and are known in the art. A pair of tape guide strips 188 conduct the tape from the feed roll down along the corner of the box. A fixed knife 189 (FIG. 9) that forms one of the knives provided for shearing off the tape after it has been fed along the box corner is provided. The knife is slotted at 190 to receive the tape. In order to mount fixed knife 189, a block 191 is fastened to the corner block 126 by screws (not shown), and block 191 mounts a spring 192 which presses against an upper face of the fixed knife 189. The fixed knife is pivotally mounted in block 191 by means of a horizontal pivot 193. Spring 192 causes the fixed knife 189 to press against a movable knife which is mounted on the corner presser block below the stay feed mechanism, and which will be described later herein, for shearing off the tape. A back up finger 194 disposed in slot 190 of the fixed knife backs up the tape upon retraction of the corner pressure shoe.

In order to drive the knurled tape feed roller 184, a bevel gear 196 is keyed to the roller shaft and meshes with a bevel gear 197 that is rotatably mounted on the stay feed head 182. Bearings (not shown) restrain the bevel gear 197 against axial motion relative to the head 182. A longitudinal drive shaft 198 extends through a bore in bevel gear 197 and the drive shaft has a keyway 199 formed thereon to engage a feather key (not shown) in bevel gear 197. This arrangement permits the corner blocks 126 to slide along rails 116 without disturbing the drive to the stay strip feed rollers. As previously described, sliding motion of the blocks 126 along the rails 116 is necessary to adjust the apparatus for the particular length of the boxes to be formed.

The drive for the longitudinal drive shafts 198 is shown in FIGS. 1, 3, 4 and 5. The cam **28*a* (FIG. 3) mounts a clamp bar 200 that is slotted at 201. Clamp bar 200 is adjustably mounted on cam 28*a* by means of clamp bolts 202 extending through slots 201. Extending from a midportion of clamp bar 200 is a crank pin 203 which is rotatably engaged with the lower end of a connecting rod 204. The throw of the crank pin 203, i.e., the distance that the crank pin 203 is offset from the axis of rotation of the cam 28*a*, can be varied by loosening the clamp bolts 202 and then sliding the bar 200 longitudinally. The upper end of the connecting rod 204 pivotally connects to a ratchet crank arm 206. Arm 206 extends from the hub 207 of a ratchet or over-running clutch assembly of conventional design which is mounted on a bracket 208 extending upwardly from the machine frame 10. Extending through the ratchet or clutch assembly is a cross shaft 209 that is intermittently driven and is the shaft that drives the stay strip feed assembly for feeding tape along the corners of the box. The other end of cross shaft 209 is supported in a vertical bracket 208*a*, as seen in FIG. 2, which bracket extends upwardly from one of the rails 116**.

Means are provided so that the drive to the stay strip feeding heads can be maintained although the rails 116 are laterally adjusted. Mounting blocks **208*a* (previously described) and 210 extend upwardly from rails 116, these blocks appearing in FIGS. 1 and 4. Bevel gears 211 are rotatably mounted in blocks 210 and 208*a*, there being one bevel gear for each rail. The bevel gears are mounted, by means not shown, so that they are axially restrained in the blocks so that the bevel gears slide with the rails 116 as the latter are laterally adjusted. The cross shaft 209 has a feather keyway 211*a* formed therein (FIG. 1) to drive bevel gears 211 by means of feather keys in the bevel gear hubs. The longitudinal shafts 198, which have previously been described as driving the stay head assemblies, are driven by bevel gears 211. As seen in FIGS. 1 and 5, transverse arms 212 are mounted on blocks 210 that mount the bevel gears 211, and longitudinal shafts 198 are rotatably mounted in the arms 212. Keyed to the ends of shafts 198 are bevel gears 213 which mesh with bevel gears 211 in order to drive the shafts 198. Shafts 198 remain fixed longitudinally. The other ends of shafts 198** are supported by the stay strip head assemblies as previously described in connection with FIGS. 8 and 9.

Thus it can be seen that rotation of the master shaft M and the cam 28*a* causes rotation of crank pin 203 and consequent oscillation of the ratchet arm 206, to produce intermittent rotation of cross shaft 209. This rotation is stepped up by the bevel gears 211 driving the bevel pinions 213 on longitudinal shafts 198, and by proper adjustment of the throw of crank pin 203 (FIG. 3) the stay strip feed mechanism can be made to feed the desired lengths of tape along the corners of each box.

*Corner Presser Mechanism*

Mounted diagonally on each corner block 126 is a corner presser shoe provided for pressing a length of the gummed tape against the associated box corner, and for simultaneously shearing the tape at the upper edge of the box. Referring to FIG. 9, there is a groove 216 formed in each corner block 126 and a recess 217 is formed in the pad 181. The associated corner presser shoe is indicated generally at 218. It is mounted on a diagonally extending shank 219, the inner end of which is formed with a head 221 to which the sealing head 222 is attached by means of screws 223. The mounting of the sealing head 222 on the head 221 provides for resilient accommodation of the block to the corner of the box. As seen in FIG. 7B, the lower end of the sealing head 222 is urged away from the head 221 by a spring 223*a*, this motion being restrained by the head of lower bolt 223. In operation the spring 223*a* is compressed by engagement of the sealing head with the corner of the box by an amount determined by the irregularities encountered. The forward face of each sealing head 222 is formed with a right dihedral angle 224 for engaging the tape at the corners of the box. The fixed knife 226, previously mentioned, is screwed to the upper face of the sealing head 222 and it is this knife which shears off the tape in cooperation with the knife 189 previously described in connection with the description of the stay feed mechanism. The sealing head is shown in its advanced position in FIGS. 8 and 9. The sealing head 222 has a vertical bore 227 formed therein to receive an electric heating element 228, which element heats the sealing head sufficiently to soften the adhesive when the face of the tape T is coated with an adhesive of the thermoplastic type. It will be understood that the machine will handle gummed taped or pressure sensitive tape as well as thermoplastic tape.

Means are provided to advance the sealing heads to press the lengths of tape against the corners of the box after tapes have been fed along the box corners and while the form is still disposed within the confines of the box. Referring to FIGS. 7 and 7A, the drive mechanism for the sealing heads originates at a pair of cam surfaces 231 formed directly on the master shaft M. Follower levers 232 are pivoted at 233 on the rails 116 and have rollers 234 that bear against the cam surfaces 231 formed on the master shaft. This cam arrangement for driving the cam followers 232 makes it possible to maintain the drive between the cam surfaces 231 and the rollers 234 regardless of the lateral adjustment of the rails 116 that mount the cam followers 232, thereby simplifying the design of the apparatus and making the drive to the corner pushers simple and direct.

The upper ends of cam follower levers 232 are slotted at 236 and a pin 237 bridges each slot. The pins 237 have longitudinal apertures therethrough (not shown) for receiving longitudinal pull rods 238. Each pull rod has a downwardly extending spring post 239 to which is connected one end of a return spring 240. The other ends of springs 240 are connected to spring mountings attached to rails 116, as seen in FIG. 3.

In order to detachably and adjustably connect the rods 238 to the levers 232, each rod has a threaded end mounting a threaded block 241 at one side of the pin 237, a block 241*a* at the other side of the pin, and a locknut 241*b*.

Referring again to FIGS. 7 and 7A, an obtusely angled bell crank indicated generally at 242 is associated with each pull rod 238. These bell cranks are mounted on pivot pins 243 extending upwardly from two of the corner blocks 126. Each obtusely angled bell crank has an inwardly extending arm 244 which carries a pivot pin 246 that connects to a link 247. Link 247 is pivotally connected to the shank 219 of the associated corner presser block assembly by a pin 248. The other arm of the obtusely angled bell crank 242 is a forked arm 249, the outer end of which mounts a pin 250. As seen in FIG. 7A, pin 250 is apertured as at 251 to receive the pull rod 238. There is a split collar 252 adjustably mounted on rod 238 by a clamp bolt 252*a*, which collar engages the pin 250. Spaced from collar 252 is a split spring seat collar 253 that is also adjustably mounted on rod 238 by a clamp bolt 253*a*. An overload relief spring 254 extends between the spring seat collar 253 and a collar 255 disposed at the fork or crank arm 249. The function of spring 254 is to transmit the drive from cam 231 to the corner pressers and the spring also serves as an overload relief spring in case of maladjustment of the parts, interference, or jamming. The force of the spring 254 can be adjusted by means of the collar 253 to provide a spring loading that suits the length of the corners of the box being sealed.

Two more bell cranks 256, one for each pull rod 238, are acutely angled. These are mounted on the other two corner blocks 126. Their arms 244*a* and 249*a* form an acute angle with each other. With the exception of the construction of the bell cranks, they are similar to the bell cranks 242. Likewise, the mounting of the bell cranks 256 as well as their connection to the presser shoes is like that previously described in connection with the obtusely angled bell cranks 242.

Referring to FIG. 7, it can be seen that the bell cranks are arranged so that the arms 244 and 244*a* are disposed at an angle of substantially 90° to the shanks 219 of their respectively associated presser shoes. This provides for the most efficient conversion of bell crank rotation to reciprocation of the shanks 219. The pressure shoe drive mechanism is very simple and rugged, it has few moving parts, requires no racks, pinions, chains or the like, and the frictional power loss in the system is minimal. The cam followers 234 slide directly on the cam faces 231 on the master shaft as the rails 116 are laterally adjusted. This simplifies the associated linkage, because it enables continuous operative engagement between cam and cam follower, regardless of the adjustment of the corner presser mechanism and thus avoids the necessity of employing more than one link or lever 232 for each pull rod 238. The corner blocks can be longitudinally adjusted by loosening the clamp bolts 252*a* and 253*a*, FIGS. 7 and 7A. The entire corner presser operating mechanism with the exception of the cam follower levers 232 can be removed by removing nuts 241*b* on pull rods 238, and by unfastening the clamps 127 (FIG. 1) from the corner blocks 126 after the stay feed assembly has been removed, as described previously.

*Operation*

The construction and operation of the various units or subassemblies of the machine of the invention have been described, and details of each operation will not be repeated. Rather, a complete cycle of operation will be described relying largely on the diagrams of FIGS. 10–15.

Referring to FIG. 10, this diagram shows the operation of the blank feed part of the mechanism. The parts are positioned in the figure in their "stopped" position except for pusher 91 which is shown retracted from the stopped position. This is the position they assume after a single revolution of the master shaft whereupon the clutch arm 39 has been allowed to drop (FIG. 2) to bring the clutch release cam 38 into the path of the clutch dog pin, to thereby release the clutch. The master shaft then is immobilized in the position shown in FIG. 2 and form 170 is positioned above a blank B as seen in FIG. 10. The feed rolls 96 and 98, and the conveyor belt continue to rotate, however, because they are driven directly from cross shaft 21, which rotates continuously as long as the drive motor is running.

To initiate a cycle of operation, the solenoid 42 (FIG. 2) lifts the cam arm 39 so that the clutch release cam 38 clears the clutch dog pin, which springs into position for clutching the cam 28 to the continuously running large sprocket 24. The master shaft M now begins to rotate, and this retracts the upper table 76 and the blank. (As seen in FIG. 10, the table 76 and pusher 91, are in their retracted position.) The table 76 and pusher 91 rotate, and this retracts the upper table 76 and the blank pusher 91 attached thereto to their retracted position for picking up a new blank (As seen in FIG. 10, the table 76 and pusher 91, are in their retracted position.) The table 76 and pusher 91 retract to the left to the position in FIG. 10, a distance sufficient to pick up a single blank which is subsequently fed through the slot formed by the block 61 and the adjustable gate 69, and into the nip of feed rolls 96 and 98. These rolls run continuously, as previously described.

Feed rolls 96 and 98 advance the blank along guide rails 134, 136 (FIG. 11) until the leading edge of the blank B strikes the adjustable stop 154 (FIG. 5). Assuming that the stop 154 and the lower table 51 have been properly adjusted for the length of the blank being processed in the machine, when the blank B strikes the stop 154, the trailing edge of the blank will be at the shoulder 63 in the threshold block 61, depressed there by the spring 64. The linear velocity of the blank, imparts a momentum to the blank such that the blank continues to move somewhat after leaving the feed rolls even though spring 64 does exert a light frictional resistance to such motion. Thus, it can be seen that no auxiliary pushers are required to feed blanks of any length completely beneath the form, because the feed rolls, the threshold block 61, and the gate 69 move with the table 51 as the latter is adjusted for blank length.

Referring now to FIG. 11, when the blank B is positioned over the guides and crimping springs, the cams 28 and 28*a* that operate the form cause the form 170 to approach the blank. In fact, the form will have been advancing toward the blank during the final portion of the feeding operation, it being necessary only that the form does not descend far enough to interfere with the blank feeding step.

Figure 12:
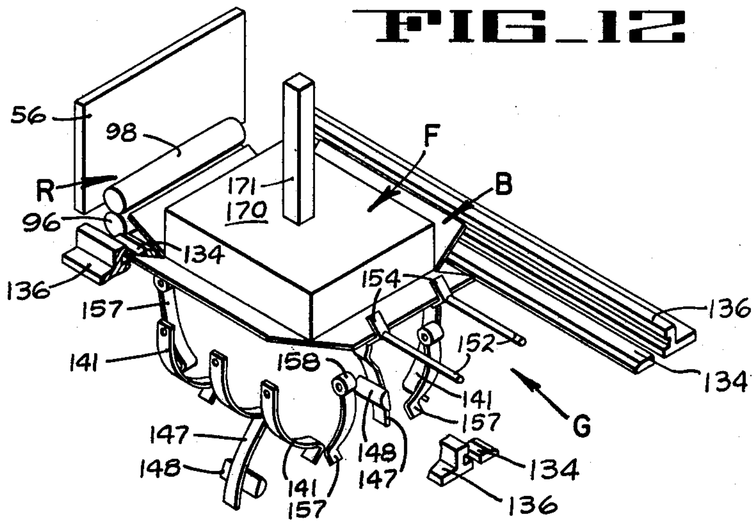

FIG. 12 shows the next stage in the cycle, wherein the form has descended far enough to engage the bottom portion of the blank. The two sides of the box are bent up by the rails 136 and 134, and these rails are beveled as shown in FIG. 12, to prevent the bending action at the sides from being too abrupt. The leading edge of the box is bent by engagement with the lower legs of the adjustable stops 154. The trailing end of the blank is initially bent as the form descends because of the restraint offered by the bar 61 and end folder 156. As the form descends further, the ends of the blank are folded by engagement with sleeves 158 of the crimping springs 157 (FIG. 10). As the form 170 continues to descend the side flaps are further bent by the bevels 142 (FIG. 5B) on the posts 132, and the end flaps are further bent by engagement with the sleeves 158 and the crimping springs 157. The side crimping springs 141 and 147 assist in folding up the sides of the blank.

Figure 13:
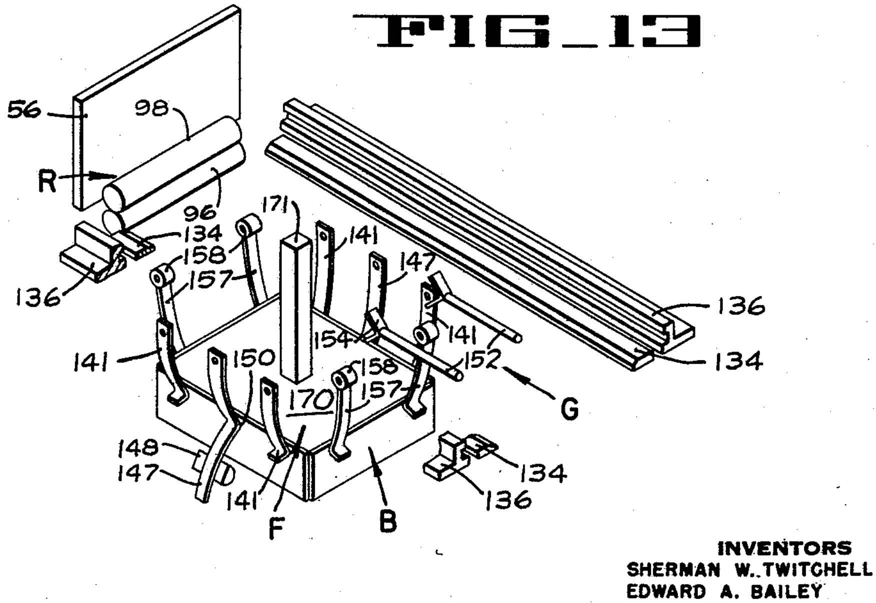

FIG. 13 shows the form 170 in its lowermost position. Here the sides and ends of the box have been fully bent up against the form, and the lower portions of the crimping springs press the side and end flaps against the form. It will be noted that the noses 150 of springs 147 formed by reverse bends therein are wedged laterally by the form so that the box bottom stops 148 are spread clear of the box when the form is in the position of FIG. 13. At this stage in the cycle, the stay strip feeding mechanism will have fed a length of gummed tape along each corner of the box. While the form is within the folded up box, as seen in FIG. 13, the corner presser drive mechanism advances the corner pressers and presses a length of tape against each corner of the box. The corner pressers are held against the box corners for a short period of time but are withdrawn before the form 170 begins to retract from the box. Latch springs 159 (FIG. 5) bear against the tip of the box adjacent its corners and strip the box from the form as the latter rises.

Figure 14:
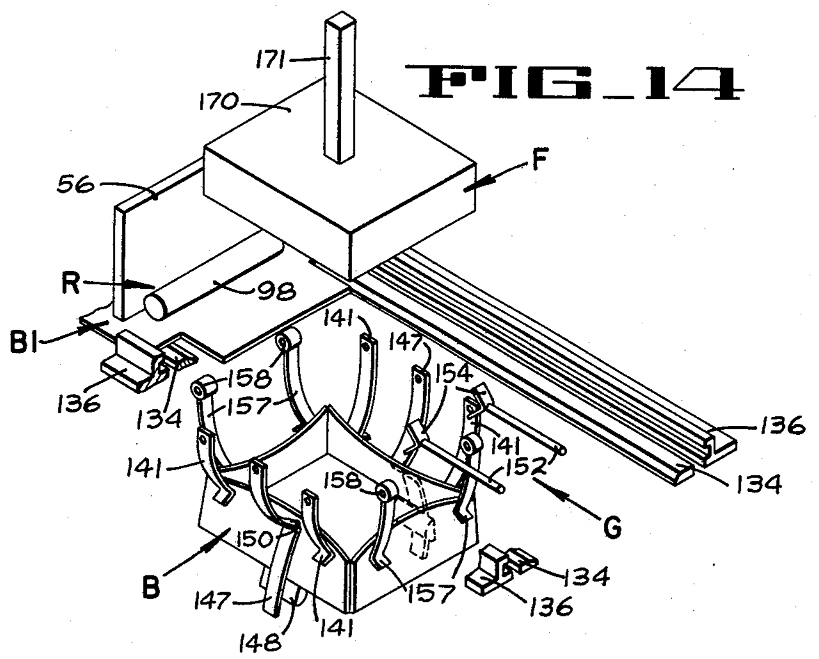

Referring to FIG. 14, the form has returned to its uppermost position and a new blank B1 is being fed over the blank guides and crimping springs. The previous blank is still in place between the crimping springs, and FIG. 14 shows how the sides and ends of the blank are crimped inwardly by the springs. Also FIG. 14 shows how the box bottom stops 148 on springs 147 prevent the box from falling clear of the apparatus at this stage. The timing of the mechanism is such that the corner pressers have now withdrawn, the corner pressers having remained against the box corners only long enough for the heaters in the corner pressers to heat up the tape and firmly adhere the tape to the box corners.

Figure 15:
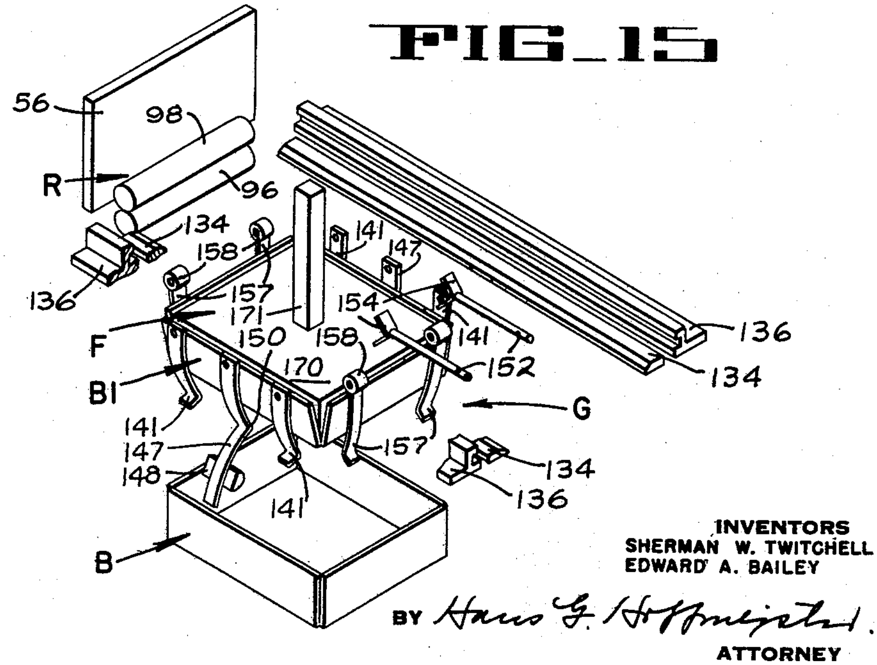

The new blank B1 is then fed over the blank guides and crimping fingers to the position shown in FIGS. 10 and 11, and the previously formed blank B remains in place as seen in FIG. 14. The cycle is now repeated, and as the form descends the new blank B1 is folded up as shown in FIG. 12. FIG. 15 illustrates the position of the form and blanks B and B1 before the form has descended far enough to fully fold up the sides and ends of blank B1. Here, as seen in the figure, just before the form reaches its lowermost position the corners of the box, backed up by the form, engage the curved portions of the crimping springs 141 and 147 on the sides of the box and springs 157 at the ends of the box. This action spreads the crimping springs and cams the box bottom stops 148 outwardly to clear the bottom of the box. In case the previously formed box B does not fall clear at this stage in the cycle, as illustrated in FIG. 15, further descent of the form will bring the newly formed box B1 against the crimped upper edges of the sides and ends of the previously formed box B, forcing the latter downwardly onto the discharge conveyor D.

Having completed a detailed description of the invention, it can be seen that the stayer of the invention is of simple and economical design. The working parts of the machine are largely disposed at the upper portion of the apparatus and are readily available for maintenance and adjustment. No specially formed operating levers extending from a lower portion of the machine to an upper portion are required in order to clear the takeaway conveyor. The corner presser mechanism is rugged and simple, and the power loss in this mechanism is very low. Also, the drive train to the corner presser mechanism is very simple, even though the rails and corner blocks supporting the corner presser mechanism are adjustable in both directions. The blank feed apparatus is simple, and no auxiliary pushers are required at the delivery side of the feed rolls. The crimping apparatus is completely automatic and self actuating, and the crimping springs also serve as box folding guide means.

While a particular embodiment of the present invention has been shown and described, it will be understood that the apparatus is capable of modification and variation without departing from the principles of the invention and that the scope of the invention should be limited only by the scope and proper interpretation of the claims appended hereto.

The invention having thus been described, that which is claimed to be new and which is desired to be protected by Letters Patent is:

1. A carton making machine comprising a frame, a transverse master shaft at an upper level of said frame, blank folding elements mounted in said frame, a blank folding form mounted on said frame for reciprocation within said elements, a blank hopper, a reciprocating blank feeder for starting a blank out of said hopper, reciprocating carton corner pressers, means for mounting laterally spaced pairs of said corner pressers for adjustment laterally of said frame, stay strip feeders mounted above said corner pressers, a plurality of cams on said master shaft, cam follower means cooperating with each of said cams for reciprocating said blank feeder and said form, means on said master shaft for driving said stay strip feeders, a pair of laterally spaced elongated corner presser cams on said master shaft within the confines of said frame, corner presser cam follower means connected to said corner pressers and slidable along said corner presser cams during lateral adjustment of said corner presser mounting means, feed rolls at the delivery side of said hopper for receiving blanks ejected by said feeder and positioning them over said blank folding elements, a carton discharge conveyor mounted in said frame below said master shaft, and means for driving said master shaft, feed rolls and discharge conveyor.

2. A carton making machine comprising a frame, a master shaft journalled on an upper portion of said frame, blank folding elements mounted in said frame, a blank folding form mounted on said frame for reciprocation within said elements, a blank hopper, a reciprocating blank feeder for starting a blank out of said hopper, carton corner pressers mounted on said frame for reciprocating motion, stay strip feeders mounted above said corner pressers, a plurality of cams on said master shaft, cam follower means cooperating with each cam for reciprocating said blank feeder, said form, and said corner pressers, means on said master shaft for driving said stay strip feeders, and means for driving said master shaft, said cam follower means for said corner pressers comprising a pair of longitudinally extending rods, a cam follower arm connected to each rod, a pair of obtusely angled bell cranks adjustably mounted on said rods and connected to two of said corner pressers, and a pair of acutely angled bell cranks adjustably mounted on said rods and connected to another two of said corner pressers.

3. A carton making machine comprising a frame, a master shaft journalled in an upper level of said frame, blank folding elements mounted in said frame, a blank folding form mounted on said frame for reciprocation within said elements, a blank hopper, blank feeder means for starting a blank out of said hopper and positioning it over said folding elements, a pair of laterally adjustable longitudinally extending rails mounted on said frame, carton corner pressers mounted on said rails, stay strip feeders mounted above said corner pressers, a plurality of cams on said master shaft, cam follower means cooperating with each cam for reciprocating said blank feeder and form, means on said master shaft for driving said stay strip feeders, means for driving said master shaft, a pair of laterally spaced elongated cams on said master shaft disposed within the lateral confines of said frame, said cam follower means for said corner pressers comprising a pair of cam follower arms pivotally mounted on said rails and slidable along said elongated master shaft cams, longitudinally extending rods connected to each cam follower arm, and lever means adjustably mounted on said rods and connected to said corner pressers.

4. A carton making machine comprising a frame, blank folding elements mounted in said frame, a blank folding form mounted on said frame for reciprocation within said elements, a blank hopper, means for feeding blanks over said blank folding elements, a pair of laterally adjustable longitudinally extending rails on said frame, a pair of corner blocks mounted for longitudinal adjustment along each rail, carton corner pressers mounted on said corner blocks, stay strip feeders mounted above said corner pressers, means for reciprocating said blank feeding means, said form, and said corner pressers, and means for driving said stay strip feeders, said blank folding elements comprising a plurality of depending convexly arched, leaf type blank folding and carton crimping springs, there being a pair of said springs mounted on each corner block and disposed for crimping engagement with the ends and sides of a carton upon withdrawal of said form inwardly from the corners thereof.

5. A carton making machine comprising a frame, a master shaft running across an upper level of said frame, blank folding elements mounted in said frame, a blank folding form mounted on said frame for reciprocation within said elements, a blank hopper, a reciprocating blank feeder for starting a blank out of said hopper, carton corner pressers mounted for reciprocating motion on said frame, stay strip feeders mounted above said corner pressers, an outboard cam on each end of said master shaft outside said frame, cam follower means engaging said outboard cams for reciprocating said form, crank means on one of said outboard cams for driving said stay strip feeders, a pair of laterally spaced elongated cam faces formed directly on said master shaft within the confines of said frame, cam follower means driven by said elongated cam faces and connected to said corner pressures, a cam face formed directly on said master shaft intermediate of said elongated cam faces, cam follower means engaging said intermediate cam face for driving said blank feeder, feed rolls at the delivery side of said hopper for receiving blanks ejected by said feeder and positioning them over said blank folding elements, a carton discharge conveyor mounted in said frame below said master shaft, and means for driving said master shaft, feed rolls and discharge conveyor.

6. A carton making machine comprising a frame, blank folding elements mounted in said frame, a blank folding form mounted on said frame for reciprocation within said elements, a table mounted on said frame for adjustment longitudinally of the machine, blank dispensing gate means mounted on said table, feed rolls mounted on said table at the delivery side of said gate means, a blank hopper on said table, a blank feeder slidably mounted on said table for starting a blank out of said hopper through said gate and between said feed rolls, drive means on said frame for reciprocating said blank feeder, means for adjustably mounting said blank feeder on said drive means, means forming a blank abutting shoulder at the delivery side of said feed rolls, adjustable stop means for receiving the leading edge of a blank delivered by said feed rolls, said stop means centering the blank over said blank folding elements, carton corner pressers mounted for reciprocating motion on said frame, stay strip feeders mounted above said corner pressers, said blank folding elements comprising a plurality of depending, convexly arched, leaf type carton crimping springs disposed for crimping engagement with the ends and sides of a carton upon withdrawal of said form, means for reciprocating said form and said corner pressers, and means for driving said stay strip feeders and said feed rolls.

7. A carton making machine comprising a frame, blank folding elements mounted in said frame, a blank folding form mounted on said frame for reciprocation within said elements, a blank hopper, means for starting a blank out of said hopper and positioning it over said elements, carton corner pressers mounted on said frame for reciprocating motion, stay strip feeders mounted above said corner pressers, drive means for said corner pressers comprising a cam, cam follower means, longitudinally exending rods connected to said cam follower means, obtusely angled bell cranks connected to said rods and to the corner pressers nearest said hopper, and acutely angled bell cranks connected to said rods and to other corner pressers.

8. A carton making machine comprising a frame, blank folding elements mounted in said frame, a blank folding form mounted on said frame for reciprocation within said elements, a blank hopper, means for feeding blanks over said blank folding elements, a pair of laterally adjustable longitudinally extending rails on said frame, a pair of corner blocks mounted for longitudinal adjustment along each rail, carton corner pressers mounted on said corner blocks, stay strip feeders mounted above said corner pressers, means for reciprocating said blank feeding means, said form, and said corner pressers, means for driving said stay strip feeders, said blank folding elements comprising a plurality of convexly arched blank folding and box crimping springs of the leaf type, there being a pair of said springs mounted on each corner block and disposed for crimping engagement with the ends and sides of a carton upon withdrawal of said form therefrom, there also being one of said springs mounted on each rail, said latter springs having stop means at a lower portion thereof for supporting a completed carton upon withdrawal of the form from the carton.

9. A carton making machine comprising a frame, blank folding elements adjustably mounted in said frame, a blank folding form mounted on said frame for reciprocation within said folding elements, a normally stationary table mounted on said frame, means providing for adjustment of said table longitudinally of the machine, blank dispensing gate means mounted on said table, feed rolls mounted on said table at the delivery side of said gate means, a reciprocating blank feeder mounted on said table for starting a blank through said gate and between said feed rolls, adjustable stop means for receiving the leading edge of a blank as delivered by said feed rolls, said stop means centering the blank over said blank folding elements, reciprocating carton corner pressers adjustably mounted on said frame, stay strip feeders mounted above said corner pressers, means on said frame for reciprocating said blank feeder, means for adjustably connecting said blank feeder to said blank feeder reciprocating means, means for reciprocating said form and said corner pressers, and means for driving said stay strip feeders and said feed rolls.

10. A carton making machine comprising a frame, blank folding elements adjustably mounted in said frame, a blank folding form mounted on said frame for reciprocation within said folding elements, a normally stationary table mounted on said frame, means providing for adjustment of said table longitudinally of the machine, blank dispensing gate means mounted on said table, feed rolls mounted on said table at the delivery side of said gate means, a reciprocating blank feeder mounted on said table for starting a blank through said gate and between said feed rolls, adjustable stop means for receiving the leading edge of a blank delivered by said feed rolls, said stop means centering the blank over said blank folding elements, a blank restraining shoulder formed on said table and facing said stop means, reciprocating carton corner pressers adjustably mounted on said frame, stay strip feeders mounted above said corner pressers, means on said frame for reciprocating said blank feeder, means for adjustably connecting said blank feeder to said blank feeder reciprocating means, means for reciprocating said form and said corner pressers, and means for driving said stay strip feeders and said feed rolls.

11. A carton making machine comprising a frame, blank folding elements adjustably mounted in said frame, a blank folding form mounted on said frame for reciprocation within said folding elements, a normally stationary table mounted on said frame, means providing for adjustment of said table longitudinally of the machine, blank dispensing gate means mounted on said table, feed rolls mounted on said table at the delivery side of said gate means, a reciprocating blank feeder mounted on said table for starting a blank through said gate and between said feed rolls, adjustable stop means for receiving the leading edge of a blank delivered by said feed rolls, said stop means centering the blank over said blank folding elements, a blank restraining shoulder formed on said table and facing said stop means, spring clip means at said shoulder for frictionally engaging the blank, reciprocating carton corner pressers adjustably mounted on said frame, stay strip feeders mounted above said corner pressers, means on said frame for reciprocating said blank feeder, means for adjustably connecting said blank feeder to said blank feeder reciprocating means, means for reciprocating said form and said corner pressers, and means for driving said stay strip feeders and said feed rolls.

12. A carton making machine comprising a frame, a master shaft running across an upper level of said frame, blank folding elements mounted in said frame, a blank folding form mounted on said frame for reciprocation within said blank folding elements, said blank folding elements comprising a plurality of convex, vertically depending, leaf type crimping springs mounted for crimping engagement with the ends and sides of the carton upon withdrawal of said form, a blank hopper, blank feeder means for starting a blank out of said hopper and delivering it to said blank folding elements, carton corner pressers mounted on said frame for reciprocating motion, stay strip feeders mounted above said corner pressers, a plurality of cams on said master shaft, cam follower means cooperating with each cam for reciprocating said form and said corner pressers, means on said master shaft for driving said stay strip feeders, and means for driving said master shaft.

13. A carton making machine comprising a frame, a master shaft running across an upper level of said frame, blank folding elements mounted in said frame, a blank folding form mounted on said frame for reciprocation within said elements, a blank hopper, means for feeding blanks over said blank folding elements, a pair of laterally adjustable longitudinally extending rails on said frame, a pair of corner blocks mounted for longitudinal adjustment along each rail, carton corner pressers mounted on said corner blocks, stay strip feeders mounted above said corner pressers, a plurality of cams on said master shaft, cam follower means cooperating with each cam for reciprocating said blank feeding means, said form, and said corner pressers, means for driving said stay strip feeders comprising a driving bevel gear rotatably mounted on each rail adjacent said master shaft, a laterally extending splined shaft slidably mounted in said driving bevel gears, a longitudinally extending splined shaft mounted on each rail, said latter shafts each carrying a driven bevel gear meshed with a driving bevel gear on said laterally extending shaft, slidable driving connections between said longitudinally extending splined shafts and said stay strip feeders, and means connected between said master shaft and said laterally extending shaft for intermittently rotating the latter, and means for driving said master shaft.

14. A carton making machine comprising a frame, laterally adjustable rails on an upper portion of said frame, a master shaft journalled on said frame below and adjacent to said rails, blank folding elements mounted in said frame, a blank folding form mounted in said frame, a blank folding form mounted on said frame for reciprocation within said folding elements, blank feeder means for positioning blanks over said folding elements, carton corner pressers mounted on said rails for reciprocating motion, stay strip feeders mounted above said corner pressers, a plurality of cams on said master shaft, cam follower means cooperating with each cam for reciprocating said form and said corner pressers, said corner presser cams being elongated for accommodating sliding motion of the corner presser cam follower means during lateral adjustment of said rails, means on said master shaft for driving said stay strip feeders, a carton discharge conveyor mounted in said frame below said master shaft, and means for driving said master shaft, feed rolls and discharge conveyor.

References Cited in the file of this patent

UNITED STATES PATENTS

| | | |
|---|---|---|
| 2,970,527 | Fisher | Feb. 7, 1961 |
| 2,982,188 | Von Hofe et al. | May 2, 1961 |